United States Patent
Majors (10) Patent No.: US 7,655,580 B2
(45) Date of Patent: Feb. 2, 2010

(54) FIRE RESISTANT PANEL AND METHOD OF MAKING

(76) Inventor: Kenneth A. Majors, 2811 Vrain St., Denver, CO (US) 80212

(*) Notice: Subject to any disclaimer, the term of this patent is extended or adjusted under 35 U.S.C. 154(b) by 164 days.

(21) Appl. No.: 11/974,177

(22) Filed: Oct. 10, 2007

(65) Prior Publication Data

US 2008/0214077 A1   Sep. 4, 2008

(51) Int. Cl.
*B32B 5/02* (2006.01)
*B32B 17/02* (2006.01)
*B32B 3/00* (2006.01)

(52) U.S. Cl. ............ 442/136; 442/180; 428/210; 428/215; 428/218

(58) Field of Classification Search ......... 442/136, 442/180
See application file for complete search history.

(56) References Cited

U.S. PATENT DOCUMENTS 5,395,684 A * 3/1995 Robinson et al. ............ 442/312
5,522,195 A * 6/1996 Bargen ..................... 52/455
6,844,275 B2 * 1/2005 Yamamoto et al. ......... 442/136
2002/0124904 A1 * 9/2002 Howland et al. ......... 139/420 R

FOREIGN PATENT DOCUMENTS

AU   200232977   * 10/2002

* cited by examiner

*Primary Examiner*—Lynda Salvatore
(74) *Attorney, Agent, or Firm*—Emery L. Tracy (57) ABSTRACT

The present invention teaches that a tightly woven, and strong sheet of fiberglass may be saturated or impregnated with sodium silicate in order to produce a strong and fire resistant sheet. A sheet of silica fabric may be adhered to the sheet of fiberglass in order to provide additional protection from combustion. The present invention further teaches that a fire door core may be mass produced from fire resistant sheets, silica sheets, and that the core may be rated for fire safety by a rating agency, thus allowing door manufacturers to produce doors using that core without individually certifying each model of door. The impregnation may occur by spraying, by rolling or by other means, and the drying process of the sodium silicate occurs after it has been saturated into the fiberglass sheet.

12 Claims, 7 Drawing Sheets

FIRE RESISTANT PANEL AND METHOD OF MAKING

CROSS-REFERENCE TO RELATED APPLICATIONS

This application claims the priority and benefit of previously filed U.S. Utility application Ser. No. 11/002,779 filed on Dec. 2, 2004, now U.S. Pat. No. 7,279,437, in the name of Kai et al and entitled RATED FIRE DOOR CORE PANEL AND METHOD OF MAKING. The entire disclosure of that application is hereby incorporated by this reference. The trademarks PALUSOL and BASF are not associated with the present applicants.

FIELD OF THE INVENTION

This invention relates generally to doors and specifically to fire resistant doors

STATEMENT REGARDING FEDERALLY FUNDED RESEARCH

This invention was not made under contract with an agency of the U.S. Government, nor by any agency of the US Government.

BACKGROUND OF THE INVENTION

Fire doors for commercial buildings must meet certain local building standards, depending upon nation, state and other level of jurisdiction regulations. In general, fire doors must withstand a given level of heat on one face for a given amount of time. During this time, the door must also block passage of smoke around its periphery, maintain structural strength and so on.

Thus, doors may be rated as "90 minute doors", "60 minute doors", "20 minute doors", or other types of ratings depending upon the testing organization and local regulations. The following invention relates to all such ratings.

However, obtaining this rating is an expensive and time consuming process. A door manufacturer must first construct the door. The interior of the door is normally a laminate or series of layers of various types of structural and fire resistant materials, this interior is called the "core". After the door manufacturer has made the core, they then add panels, rails, stiles, and other material to the outside facings of the door to provide it with an appearance suitable for commercial use: expensive wood materials, multi-panel arrangements, and so on. Then the manufacturer sends the door to the rating agency for testing. The rating agency will take the door, place it in what amounts to a large oven, and begin exposing one side to flame and extremes of heat. In one testing arrangement, after the door has passed the time rating (for example 90 minutes) without allowing excess heat to reach the "cool" side, it is then required to pass a structural test involving shooting water from a fire hose at the burned side for a set amount of time to see if the door collapses under this heavy load.

This testing requirement imposes costs and labor upon door manufacturers. In effect, each model of door must be individually certified to be fire resistant before it can be sold. This imposes a high barrier to entry into the market, since there is no provision for a door manufacturer to buy a "pre-certified" and pre-made core and use it to make an automatically certified door.

Sodium silicate is an extremely useful material for door manufacturers when they are attempting to make doors with the necessary fire resistance. Sodium silicate may be any one or a mixture of several compounds having silica (Si2O) and Sodium oxide (Na2O). Forms of "soluble glass" or "water glass" include sodium disilicate, sodium metasilicate, sodium orthosilicate, sodium tetrasilicate and so on. These may be produced by combining sand and sodium carbonate. Considered a non-hazardous substance (MSDS standards) it does require gloves for handling, as it is extremely destructive of human mucus membranes and may theoretically even cause burns on skin contact.

Importantly, sodium silicates have high melting points and are water soluble. More importantly, when exposed to heat, hydrated sodium silicate absorbs the heat and uses it for a phase transformation. Like water boiling from liquid to gas and maintaining a temperature of 100 degrees C. during the process, sodium silicate changes form, unlike water, the sodium silicate does not boil away or change from a liquid to a gas.

Exposed to heat, several energy absorbing changes occur in hydrated sodium silicate. Firstly, it begins to give up the water molecules trapped within it. The boiling away water molecules carry away a good deal of heat, but crucially the second effect is that the sodium silicate expands (intumesces) from a relatively solid form into a glass foam containing numerous cavities and pockets. This transformation itself absorbs heat and the result is a notably thicker mass of an excellent insulator having a melting point above 800 degrees C. (circa 1500 degrees Fahrenheit). The thickness change is very dramatic: a ratio of six to one expansion is possible.

Thus, door manufacturers frequently use sodium silicate when constructing doors, in particular while the door manufacturer is constructing the core of the door. Care is taken to ensure that the sodium silicate is held in place by materials which will allow its expansion during combustion, this in fact may be regulatory requirement in some jurisdictions.

However, sodium silicate has certain disadvantages. Most notably, exposed to heat it tends to lose structural strength. This means that a layer of sodium silicate within a door may begin to "slump" off of the door as the door burns away. By falling away or slumping away in a mass, the sodium silicate layer surrenders a great deal of its benefit. Door manufacturers must therefore use care in selecting how the sodium silicate layer of the door is supported by the adjacent layers.

However, common sense dictates that the sodium silicate be used as compactly as possible, with as low a mass of additional matter, so that door manufacturer is able to produce a light and not overly thick door.

PALUSOL brand panel is a mixture of solid sodium silicate with a low percentage of dissociated strands of fiberglass fabric mixed in, sold in sheets large enough to individually span the width and height of a typical door. While the fiberglass strands provide some limited degree of strength, BASF specification sheets for PALUSOL brand panel state that there is a risk of breakage is a single panel is transported by itself, and that it must be stored laid flat, and even that the peripheral 5 mm border of the sheet must be trimmed prior to actual use by a door manufacturer in construction of a door. This building product is produced by mixing into a large flat container of sodium silicate the loose fibers of fiberglass or organic fabric, then drying the hydrated sodium silicate until it assumes a solid cellular form with a degree of water still therein.

One PALUSOL brand fire panel produced by BASF includes a wire mesh at 25 millimeter intervals (almost exactly one inch squares between wires). This is necessary for the door manufacturers as an extended area of PALUSOL will simply slump under heat or even buckle while the door manufacturer is attempting to work with it.

It would be preferable to provide a door core not requiring individual certification of each model of door by door manufacturers.

It would further be preferable to provide a product having better thermal protection than panels of sodium silicate with loose fiberglass therein.

It would further be preferable to provide sodium silicate panels having greater structural strength.

It would further be preferable to provide panels having a sodium silicate content which does not require as much effort in preservation and which lasts longer in practice.

It would further be preferable to provide panels having a panel providing exceptional fire resistance.

SUMMARY OF THE INVENTION

General Summary

The present invention teaches that a tightly woven, and strong sheet of fiberglass may be saturated or impregnated with sodium silicate in order to produce a strong and fire resistant sheet. A sheet of silica fabric may be adhered to the sheet of fiberglass in order to provide additional protection from heat and combustion.

The present invention further teaches that a fire door core may be mass produced from fire resistant sheets, silica sheets, and that the core may be rated for fire safety by a rating agency, thus allowing door manufacturers to produce doors using that core without individually certifying each model of door. The impregnation may occur by spraying, by rolling or by other means, and the drying process of the sodium silicate occurs after it has been saturated into the fiberglass sheet.

The present invention further teaches a method of manufacture of the a sodium silicate building sheet, comprising the steps of producing a tightly woven fiberglass sheet, impregnating it with sodium silicate, and allowing it to dry.

Summary in Reference to Claims

In addition to the previously mentioned aspects, advantages, objectives and embodiments of the present invention, it is a first aspect, advantage, objective and embodiment to provide a fire resistant sheet, the sheet comprising:

a silica fabric sheet; and a first strong fiberglass mat saturated with sodium silicate, the mat bonded to one side of the silica fabric sheet.

It is another aspect, advantage, objective and embodiment to provide a fire resistant sheet, wherein the fiberglass mat has a minimum thickness of 0.015 inch.

It is another aspect, advantage, objective and embodiment to provide a fire resistant sheet, wherein the strong fiberglass mat has a minimum density of 0.5 ounce per square foot.

It is another aspect, advantage, objective and embodiment to provide a fire resistant sheet, wherein the impregnation with sodium silicate further comprises at least 0.02 gallons of approximately 40% hydrated sodium silicate per square foot of strong fiberglass mat.

It is another aspect, advantage, objective and embodiment to provide a fire resistant sheet, further comprising:

a second strong fiberglass mat saturated with sodium silicate firmly attached to one side of the silica fabric sheet.

It is another aspect, advantage, objective and embodiment to provide a fire resistant sheet, the sheet comprising:

a first strong fiberglass mat saturated with sodium silicate.

It is another aspect, advantage, objective and embodiment to provide a door core comprising:

at least a first structural layer of silica fabric, at least a second layer of strong fiberglass mat saturated with sodium silicate bonded to one surface of the first structural layer; and at least a third structural layer of compressed fiberboard bonded to the second layer of strong fiberglass mat saturated with sodium silicate.

It is another aspect, advantage, objective and embodiment to provide a door core comprising: wherein the strong fiberglass mat is saturated with at least 0.02 gallons of approximately 40% hydrated sodium silicate per square foot.

It is another aspect, advantage, objective and embodiment to provide a door core comprising: wherein the strong fiberglass mat further comprises chop-strand fiberglass bound together.

It is another aspect, advantage, objective and embodiment to provide a door core comprising: wherein the strong fiberglass mat has a minimum thickness of 0.015 inch.

It is another aspect, advantage, objective and embodiment to provide a door core comprising: wherein the strong fiberglass mat has a density of 0.5 ounce per square foot or greater.

It is another aspect, advantage, objective and embodiment to provide a door core further comprising at least a fourth layer of strong fiberglass mat saturated with sodium silicate bonded to the first, second or third layers.

It is another aspect, advantage, objective and embodiment to provide a door core comprising: further comprising at least one additional structural layer comprising one member selected from the group consisting of: silica cloth, hardboard, fiberglass cloth, carbon fiber, carbon fiber fabric, metal sheet, metal mesh, composite mesh, plastic sheet, and combinations thereof.

It is another aspect, advantage, objective and embodiment to provide a door core comprising: wherein the strong fiberglass mat further comprises chop-strand fiberglass bound together.

It is another aspect, advantage, objective and embodiment to provide a method of making a fire resistant sheet comprising the steps of:

i) providing a strong fiberglass mat;

ii) saturating the strong fiberglass mat with hydrated sodium silicate; and iii) drying the strong fiberglass mat.

It is another aspect, advantage, objective and embodiment to provide a method of making a fire resistant sheet further comprising:

iv) heating the strong fiberglass mat during drying.

DETAILED DESCRIPTION

Figure 1A:
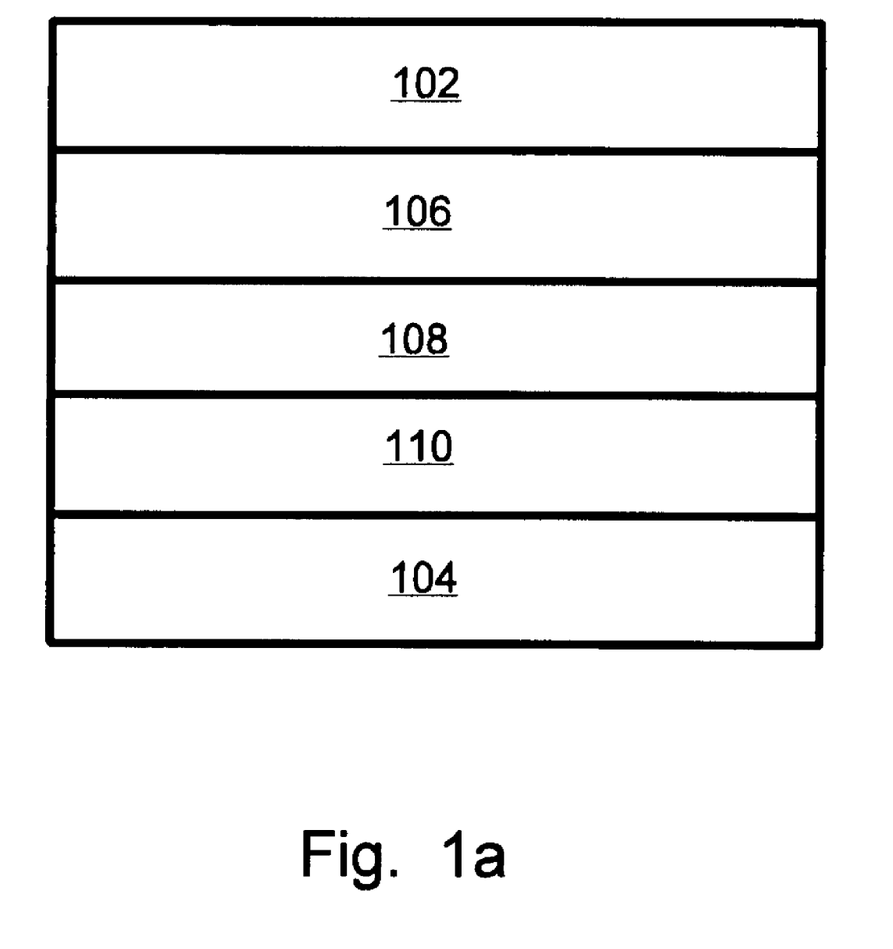
FIG. 1a is a block diagram side view with vertical scale exaggeration of a 20 minute door core according to the present invention.
Figure 1B:
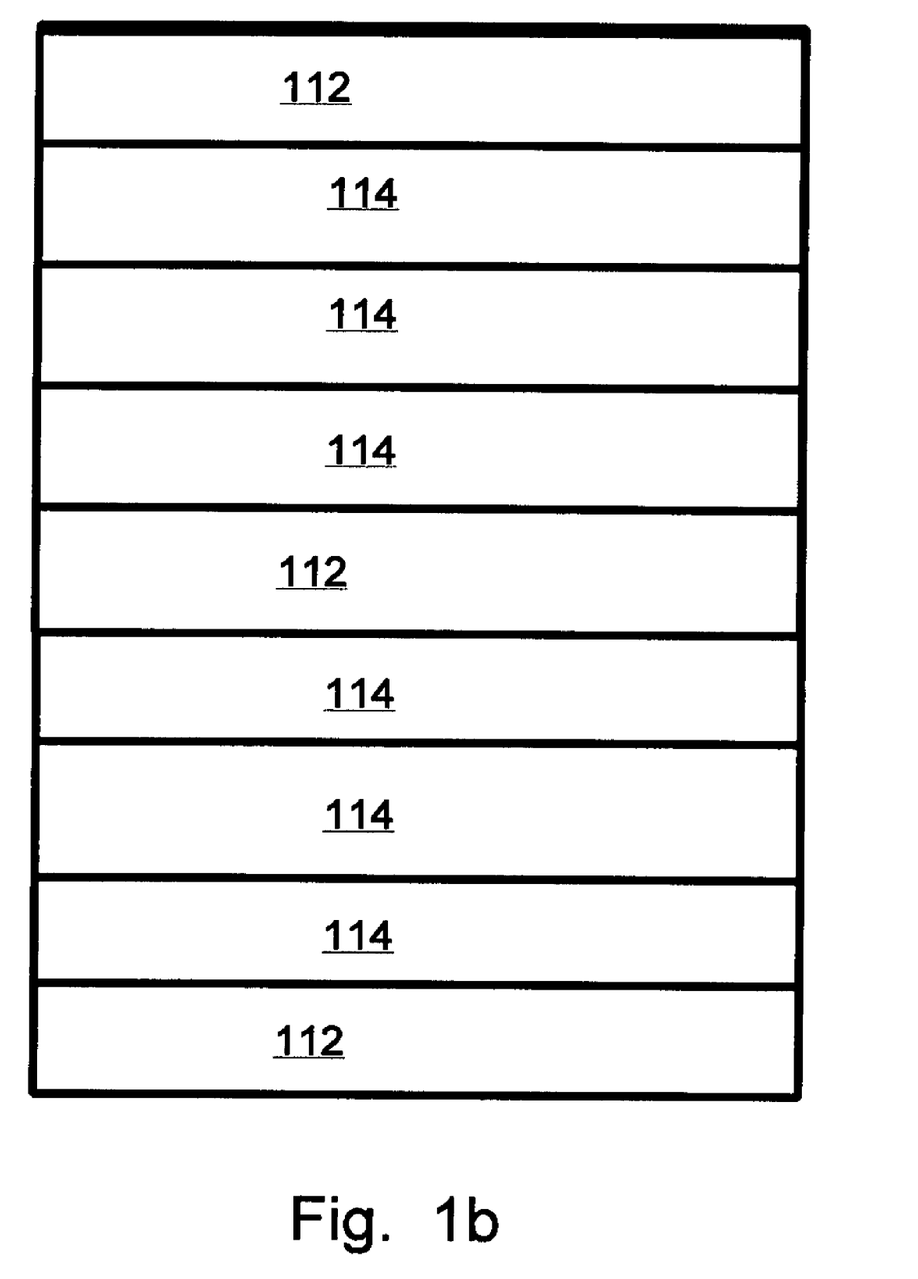
FIG. 1b is a block diagram side view with vertical scale exaggeration of a 45/60 minute door core according to the present invention.
Figure 1C:
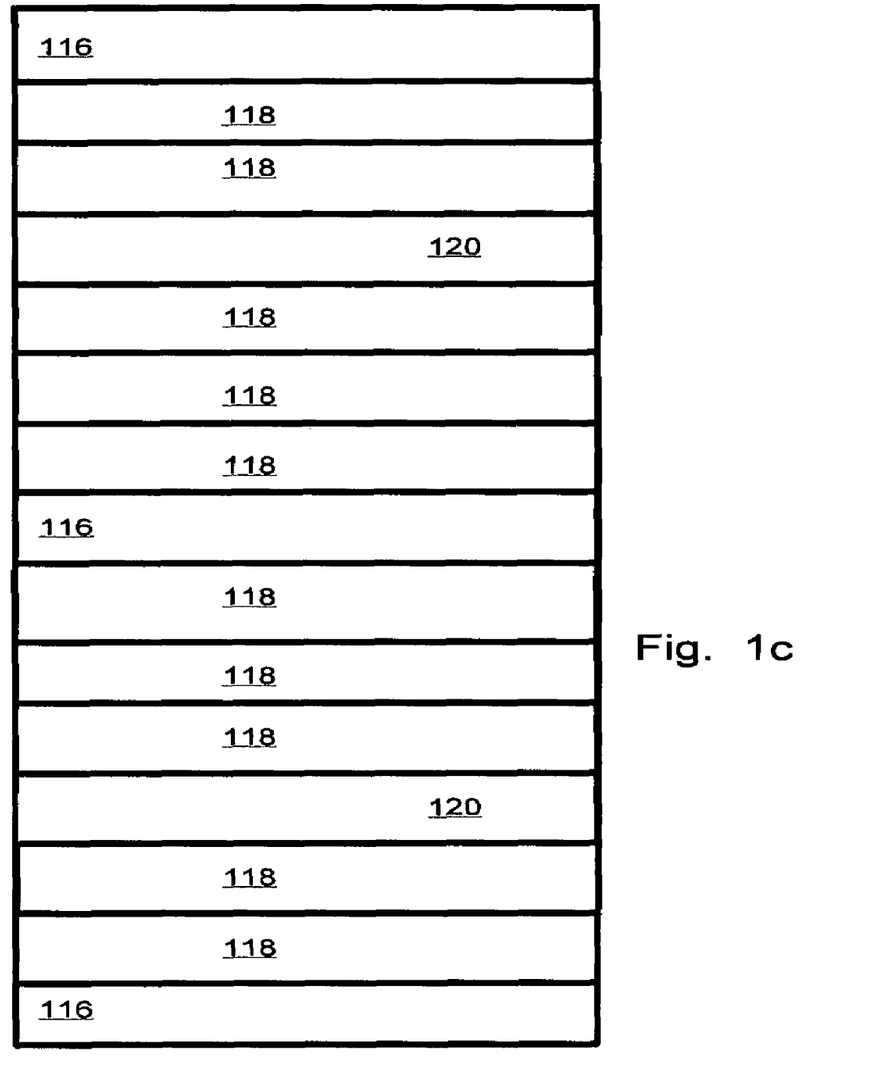
FIG. 1c is a block diagram side view with vertical scale exaggeration of a 90 minute door core according to the present invention.

In the presently preferred embodiment and best mode presently contemplated for carrying out the invention, a door core is constructed of at least two sheets of compressed particle board ("hardboard") and two fire resistant sheets of the present invention. FIG. 1a is a block diagram side view with vertical scale exaggeration of a 20 minute door core according to the present invention. FIG. 1b is a block diagram side view with vertical scale exaggeration of a 45/60 minute door core according to the present invention. FIG. 1c is a block diagram side view with vertical scale exaggeration of a 90 minute door core according to the present invention. Hardboard sheets ("structural layers") sandwich between them fire resistant sheets, in FIG. 1c, the sandwich includes silica fabric.

The hardboard sheets 102, 104, 112 may be high-density compressed wood or the like, while the fire resistant sheets 106, 108, 110, 114 seen in FIGS. 1a and 1b may be 2 oz. chopped strand fiberglass sheets saturated with sodium silicate. The sodium silicate, applied to one or both sides of the sheet, soaks through the entire sheet until saturation is reached.

A chop strand fiberglass mat or sheet is one made by chopping strands of fiberglass and then pressing them together with a binder, resulting in a strong sheet able to maintain itself in a semi-rigid planar configuration. The tight fiberglass mat nonetheless has interstices which may be saturated with sodium silicate.

Note that in FIG. 1c, structural sheet 116 and fire resistant sheet 118 may be as described, however, for 90 minute fire resistance in a door core, it is necessary that additional protection be provided. In particular, as the chopped strand fiberglass sheets 118 are exposed to flame, they expand and potentially lose structural integrity. Silica fabric sheet 120, or even more than one silica fabric sheet 122, may be used for this purpose.

This is a departure from known techniques, as silica fabric is known for use in such items as fire-proof suits for firefighters to wear: silica fabric is flexible. Because of the flexibility of silica fabric, use of it in a rigid application like a door or fire resistant sheet had been contrary to prior teaching. Flexible materials very obviously are not used for construction of rigid panels. However, it may be seen that in the embodiment of FIG. 1c, the innermost structural sheet has two layers of sodium silicate heat resistant fabric on each side, and that these layers are held in place by the silica fabric layers on either side. In addition, the silica fabric is also saturated with sodium silicate, making it rigid as well, an unexpected combination not known before. In garment applications, flexibility is mandatory and thus stiffening of the silica fabric is unknown, while in building applications, use of a flexible material is unknown.

This assembly may bonded together using sodium silicate itself, thus providing additional sodium silicate in the construction beyond that present in the fire resistant sheets. Other adhesives may be used to assemble the door core. In addition, the layers may be pressed together immediately after being bonded, in a press large enough to press the entire assembly at once. Multiple cores may be pressed at one time. A fire resistant sheet is assembled with another fire resistant sheet and three hardboard sheets into a stack. Note that since sodium silicate is an effective glue, the stack by itself has some structural strength. However, for additional cohesion, a press may be used to press the stack. In other embodiments, the stack may be held together without pressing during manufacture, for example by the sodium silicate, by fasteners, geometry and so on.

Note that while a single stack can be pressed, thus pressing a single door core, (which is useful) it is also practical to press several stacks at the same time, so that one pressing operation may produce several doors. Since the exterior sides of the hardboard sheets have no sodium silicate on them, there is little adhesion between stacks, unlike within stacks.

After assembly, example cores in doors may be sent to a fire door testing and certification agency for that testing and certification. The core is sent for certification in a door of the thinnest possible wood: thereafter, any door having thicker wood is acceptable at the same rating without suffering certification. When a door manufacturer buys a core, it has already been certified, thus greatly easing the burden on the door manufacturer.

In embodiments of the present invention the door core may have at least one structural layer selected from the group consisting of: hardboard, fiberglass cloth, carbon fiber, carbon fiber fabric, metal sheet, metal mesh, composite mesh, plastic sheet, silica fabric and combinations thereof. Thus, hardboard is not the only possible material for the structural layers of the invention.

Figure 2:
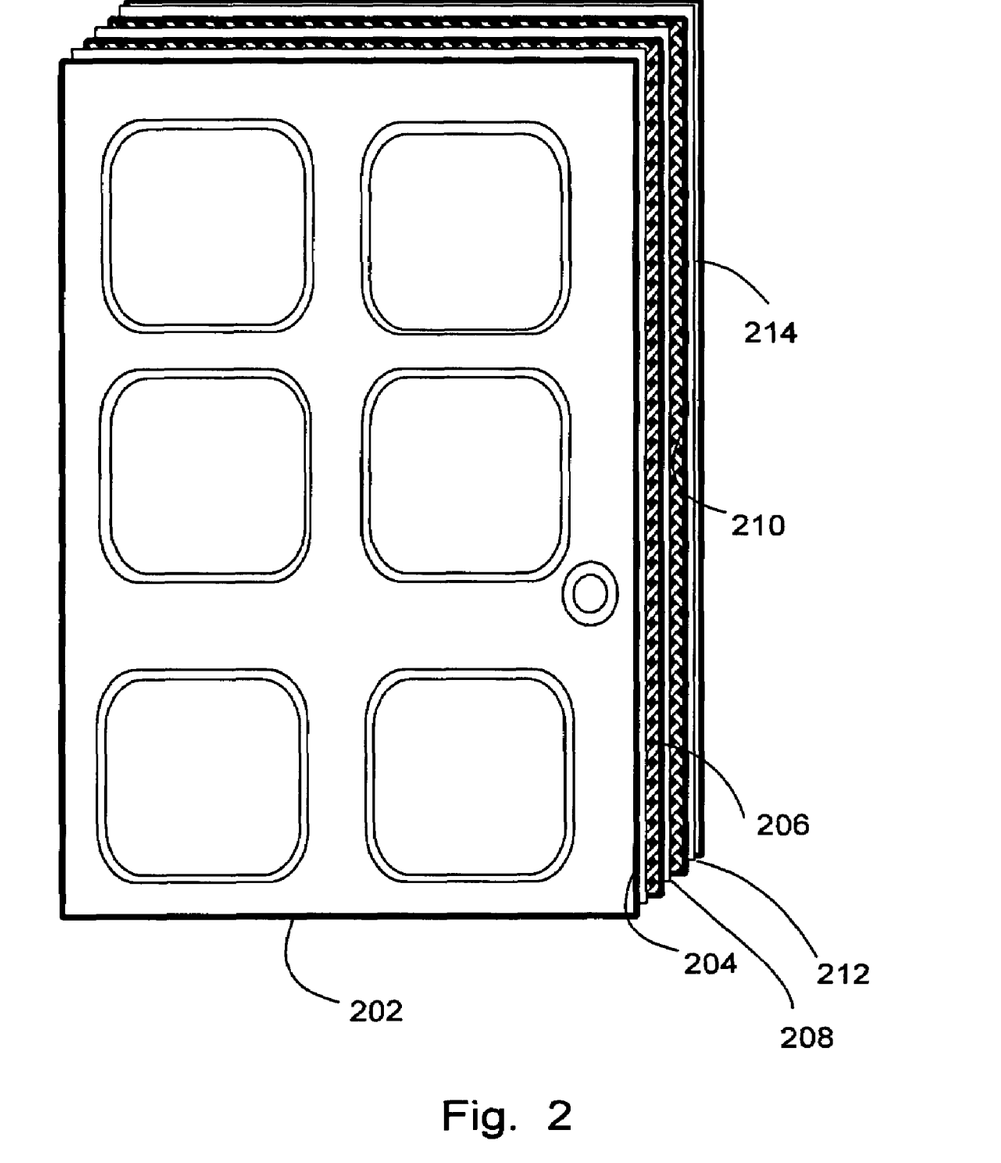
FIG. 2 is a perspective view of a door made with the present invention, with the perspective scale exaggerated for clarity.

FIG. 2 is an exaggerated perspective view of a door made with the present invention, in which both the door and the door core of the invention are exploded. Note that the door manufacturer will not deal with the parts of the door core, as that is pre-made and pre-rated before sale. Door face 202 adheres to the core on one side, while opposite door face 214 adheres on the other. The manufacturer may use adhesives or fasteners or a combination of both for this process. The layers of fire resistant material 206, 210 (which may be either chopped strand fiberglass sheets saturated with sodium silicate or silica fabric, depending on the application and alternative embodiment) are shown sandwiched between layers of hardboard 204, 208, and 212.

Structurally, the pre-made core of the invention is much stronger than the built core of prior art. First, the invention core 100 has exterior surfaces of hardboard and thus has a stronger surface for attachment to the door facings than does the known prior art. This also means that the core of the invention takes and holds fasteners such as screws better than a built up core would. Second, it may have three or more hardboard sheets, not two, providing additional strength. Thirdly, the fire resistant sheets of the invention are strong sheets comprising a tightly woven chopped strand fiberglass sheet saturated with sodium silicate rather than the sodium silicate matrix of PALUSOL (which merely has a much looser and lighter use of loose individual fibers of fiberglass fabric). Fourthly, the present invention may have layers of silica fabric as either heat resistant layers or structural layers, providing structural retention of the sodium silicate layers even after heating, when the layers swell and start to suffer reduced structural integrity.

Conventional wisdom would suggest that the door core painfully built up out of prior art sheets would have superior fire resistance properties to the pre-made door core of the invention, since the prior art core has three layers of much more pure hydrated sodium silicate while the invention door core has multiple layers which are based on fiberglass sheets saturated impregnated with sodium silicate, and layers of silica fabric, which is flexible and fire resistant but not insulating. However, testing has confirmed the unexpected fact that the pre-manufactured door core of the invention displays fire resistance comparable to prior art door cores (built by the door makers, not by the maker of nearly pure hydrates sodium silicate). Without wishing to be bound by any particular theory, it is believed that this is due to the superior structural strength of the saturated sheets of fiberglass of the invention, combined with the non-existent structural strength but exceptional heat resistance of silica fabric. Silica fabric by itself may prevent the sheets of the door from disintegrating under conflagration, and the fiberglass sheets are very strong in comparison to sodium silicate prior art sheets. In particular, the loose and disorganized fibers in prior art hydrated sodium silicate sheets are intended only to provide sufficient strength for minimal handling until the prior art sheets may be safely sandwiched between other sheets of the built up prior art door. They may not always provide sufficient structural strength to hold the hydrated sodium silicate in place during testing or even actual emergencies, when the sodium silicate sheet may slump away from the door before being entirely heated or consumed. This is because as the sheet of nearly pure sodium silicate intumesces by up to six times its own size and suffers the loss of the structural supports on either side, it may reach a point of loss of support. The invention on the other hand uses fire resistant saturated sheets for the which the initial structure is a tightly woven chop strand fiberglass sheet having a reasonable degree of structural strength and a fair degree of its own heat resistance, and then may add silica fabric sheets which may transfer heat but do not burn, and thus retain within them expanding sodium silicate sheets. The invention may in embodiments have either the prior art type of nearly pure sodium silicate sheet sandwiched with silica fabric, or may have strong chopped strand sodium silicate sheets sandwiched with silica fabric, or may have only the chop strand sodium silicate sheets without silica fabric. In any embodiment, it may then have structural sheets useful under normal conditions (that is, "pre-fire" conditions of normal use of the door) to retain the shape. Note also that the chop strand fiberglass sheets are strong enough to retain their own shape under some conditions. Under heat, the fire resistant sheet of the invention will sacrifice the entire hardboard sheet on one side without slumping away from the hardboard sheet behind it, which it continues to protect. Thereafter, the fire resistant sheet of the invention has sufficient structural strength to avoid slumping, thus ensuring that it then sacrifices itself with a high degree of efficiency until it too is entirely heated or consumed. Thus, the structural strength of the invention (an ability to hold together under heat) allows each layer of the door core to sacrifice itself at high efficiency without failing early. Of course, fiberglass itself is an insulator, and so the addition of a tightly woven chopped strand fiberglass sheet not present in the prior art adds an additional heat resisting element. The fiberglass sheet may be of a variety of thicknesses ranging from 1/64 of an inch up to substantially thicker measurements such as 1/32 inch, 1/16 inch, 1/8 inch, 5/32 inch, 3/16 inch, 7/32 inch, 1/4 inch, 9/32 inch, 5/16 inch, 11/32 inch, 3/8 inch, 13/32 inch, 7/16 inch, 15/32 inch, 1/2 inch, intermediate values and/or greater thicknesses.

The term "approximately 40% hydrated" refers to the fact that 40% hydrated sodium silicate as sold may be hydrated in a range from 35% to 45%. Sodium silicate having other degrees of hydration may be used in the method and construction of the device of the invention.

The amount of hydrated sodium silicate applied to the tightly woven fiberglass sheets to produce the fire resistant sheets is considered important. In the best mode now contemplated and the presently preferred embodiment, fully 0.625 gallons (approx. 2.5 liters) of hydrated sodium silicate is applied to a single door size sheet of approximately 44 by 97 inches in dimension (roughly 112 cm×246 m). This is roughly 0.02 gallons per square foot. This can be reduced, thus reducing fire resistance of the sheet, but at some point the fire resistance of the sheet becomes so low that the thickness of the door core made with the sheet becomes commercially unacceptable. At the present time, a minimum of 0.01 gallons per square foot is contemplated, however, this is not necessarily a limit.

In addition to rolling and spraying, soaking the hydrated sodium silicate onto the tightly woven fiberglass sheet, curtain coating the hydrated sodium silicate onto the tightly woven fiberglass sheet, and combinations thereof may be employed, or any other method of application.

Figure 3:
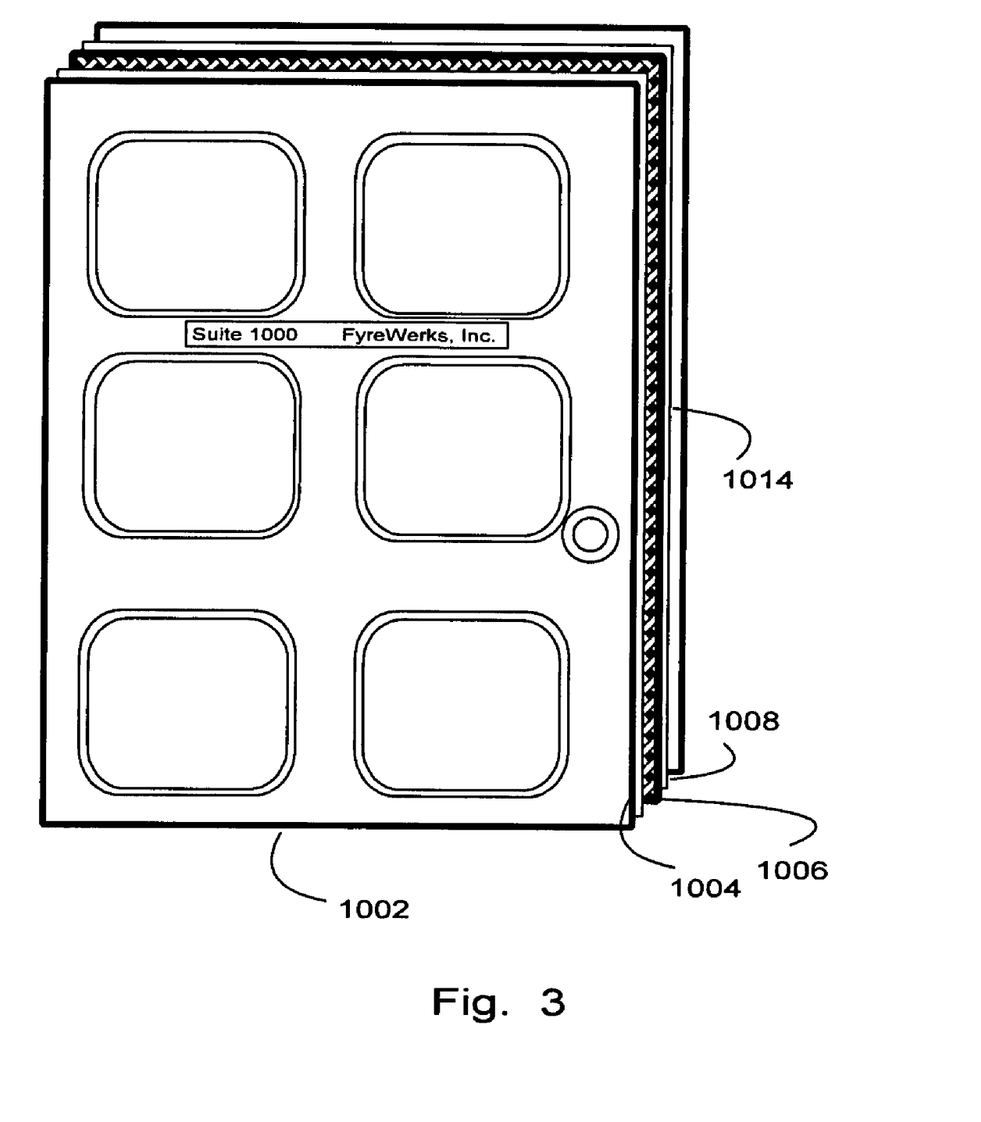
FIG. 3 is a perspective view of another embodiment of a door made with the present invention, with the perspective scale exaggerated for clarity.

FIG. 3 is an exaggerated perspective view of a 20 minute door core made according to the invention. This core embodiment is conceptually similar to the door core shown previously, however, it has only one fire resistant layer of dried saturated tightly woven fiberglass sheet, not two, and also has two layers of hardboard, not three. (The hardboard layers add additional fire resistance, as they do take a few minutes to burn.) Layers 1004 and 1008 are hardboard, layer 1006 is a fire resistant sheet according to the invention: chopped strand fiberglass saturated with sodium silicate, or silica fabric saturated with sodium silicate or without.

Testing by fire door testing, certification and rating agencies provides the door cores of the invention with a rating of 90 minutes for the embodiment of FIG. 1*c*, having 15 layers, and a rating of 20 minutes for the embodiment of FIG. 3, having 3 layers.

Figure 4:
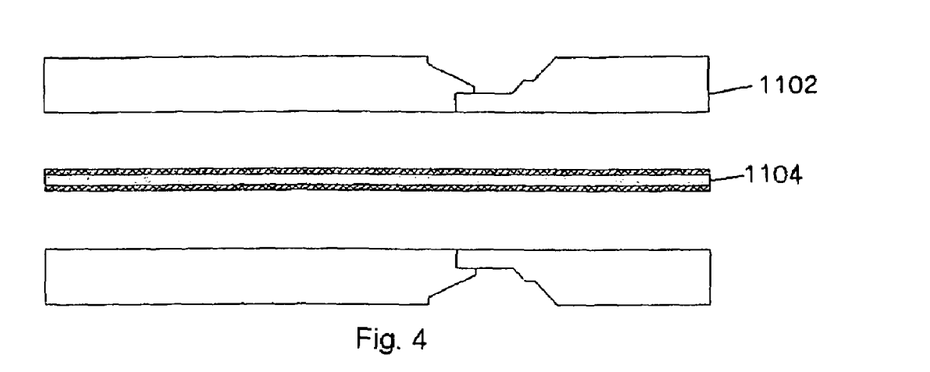
FIG. 4 is a cross-sectional view of a first step of construction of a door using the invention.
Figure 5:
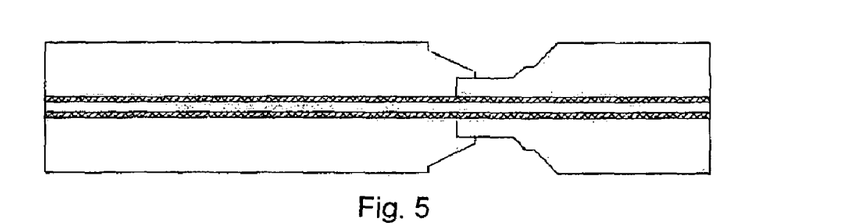
FIG. 5 is a cross-sectional view of a second step of construction.
Figure 8:
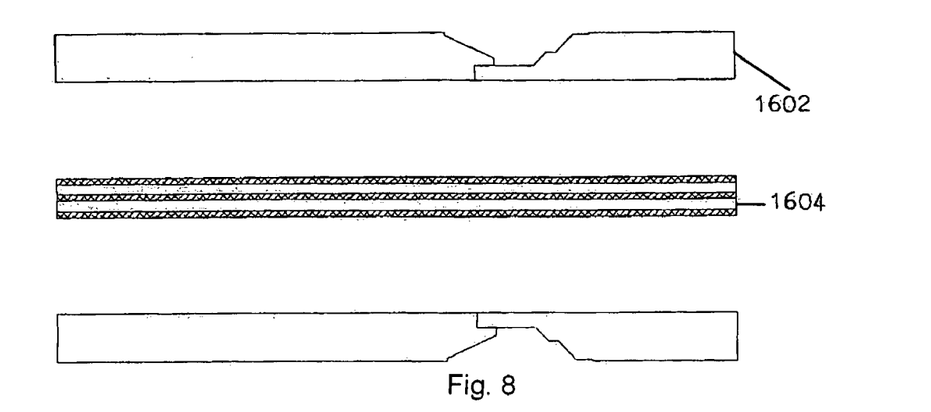
FIG. 8 is an exploded cross-sectional view of a 60 minute fire door made according to the invention, in a first step of construction.
Figure 9:
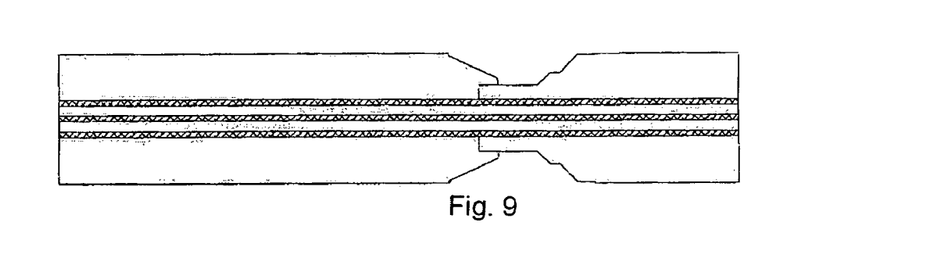
FIG. 9 is a cross-sectional view of a second step of construction.

FIG. 4 is a cross-sectional view of a first step of construction of a 20 minute door, while FIG. 8 is a cross-sectional view using a 60 minute door core to make a 60 minute rated door: assembling a set of facing/inserts 1102/1602 on either side of a completed core 1104/1604. As discussed, a door maker may simply fasten hardwood inserts/facing to the sheet near the edge/facing over the sheet: this step is then completed in FIGS. 5 and 9.

Figure 6:
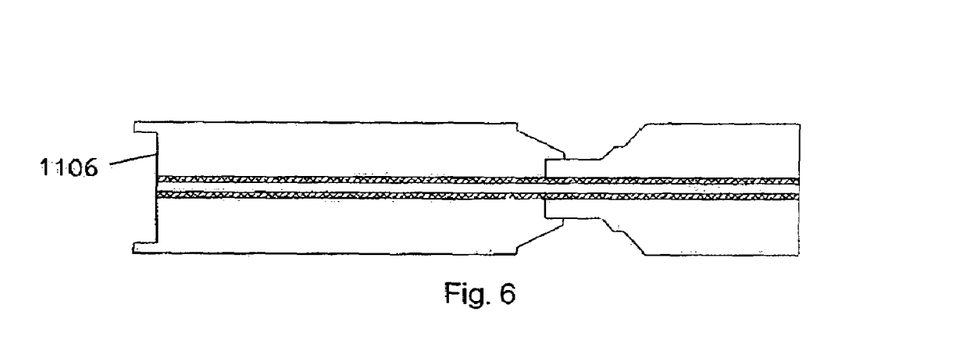
FIG. 6 is a cross-sectional view of a third step of construction.
Figure 10:
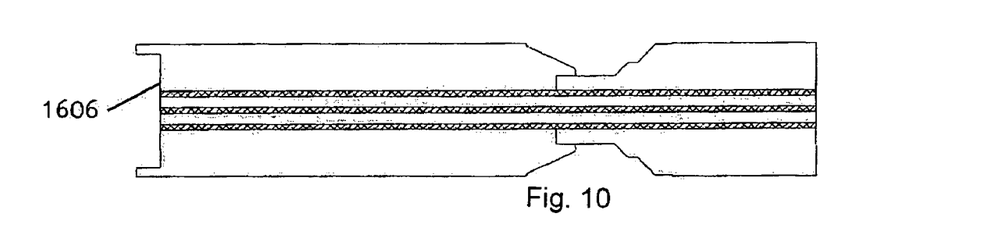
FIG. 10 is a cross-sectional view of a third step of construction.

Then the edges of the door assembly may be planed down in a groove 1106/1606 to reveal the inserts, as shown in FIG. 6 and corresponding FIG. 10 for the 60 minute embodiment, both showing a cross-sectional view of a third step of construction.

Figure 7:
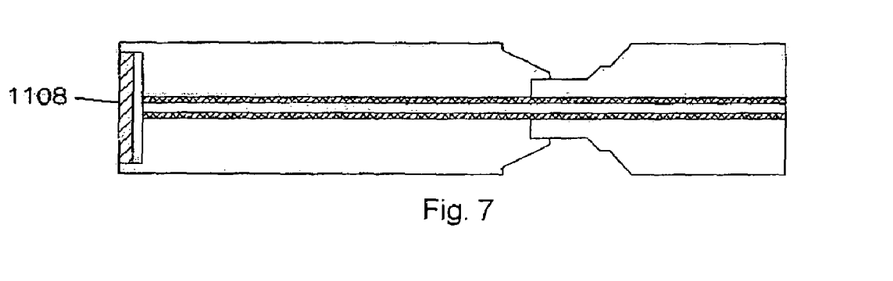
FIG. 7 is a cross-sectional view of fourth step of construction.
Figure 11:
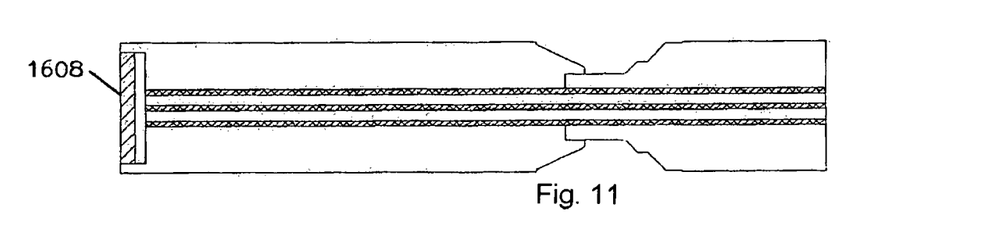
FIG. 11 is a cross-sectional view of a fourth step of construction.

FIG. 7 is a cross-sectional view of fourth step of construction for the 3 layer embodiment while FIG. 11 shows this for the 5 layer embodiment: a layer of fire resistant material 1108/1608 added facing the edge of the door, that is a narrow strip at a 90 degree angle to the main door surface. This is optional, though sodium silicate based fire resistant sheets largely expand perpendicular to the surfaces of the sheets. (Different categories of doors have different requirements, thus category "A" doors have one set of requirements in this regard, while category "B" may have entirely different requirements.) The narrow end strip will expand under heat in the direction of the door jamb, thus sealing the door into the jamb and preventing smoke from jetting around the door. This edge sealing is mandatory under many regulatory schemes.

What the door manufacturer does not have to do is build up the core out of fire resistant sheets and hardboard, and the door manufacturer also does not have to get each new model of door rated, both significant savings in time and effort.

Thus, a door manufacturer may easily buy the pre-rated door of the present invention and use it as a core for a commercial door. Even a 90 minute core is only approximately ½" to ⅞" thick (roughly 12.7 to 23 mm), while a 20 minute core is only 1/64 to ⅛ of an inch thick (roughly 0.5 to 3 mm). It is faced with hardboard on both, an excellent surface for receiving fasteners (especially compared to prior art sheets, which tend to be fairly weak). It is also an excellent surface to receive adhesives, which is a commercially important improvement over prior art sheets which do not accept standard woodworking adhesives.

The invention not only eliminates the necessity for door makers to build a door core and get each new model of door rated, but it also sells for a price easily competitive with the raw materials (PALUSOL brand sheets and hardboard) of prior art door core constructions, and saves labor costs in assembly for the door manufacturer.

The disclosure is provided to allow practice of the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the claims appended hereto.

What is claimed is:

1. A fire resistant sheet, the sheet comprising:
   a sheet of silica fabric; and
   a first fiberglass mat saturated with sodium silicate, the mat bonded to one side of the sheet of silica fabric;
   wherein the impregnation with sodium silicate further comprises at least 0.01 gallons of approximately 40% hydrated sodium silicate per square foot of strong fiberglass mat/silica sheet.

2. The fire resistant sheet of claim 1, wherein the sheet of silica fabric is saturated with sodium silicate.

3. The fire resistant sheet of claim 1, wherein the fiberglass mat has a minimum thickness of 0.015 inch.

4. The fire resistant sheet of claim 1, wherein the strong fiberglass mat has a minimum density of 0.5 ounce per square foot.

5. The fire resistant sheet of claim 1, further comprising:
   a second strong fiberglass mat saturated with sodium silicate firmly attached to one side of the sheet of silica fabric.

6. A door core comprising:
   at least a first structural layer of silica fabric;
   at least a second lay of strong fiberglass mat saturated with sodium silicate bonded to one surface of the first structural layer; and
   at least a third structural layer of compressed fiberboard bonded to the second layer of strong fiberglass mat saturated with sodium silicate;
   wherein the strong fiberglass mat is saturated with at least 0.01 gallons of approximately 40% hydrated sodium silicate per square foot.

7. The door core of claim 6, wherein the strong fiberglass mat further comprises chop-strand fiberglass bound together.

8. The door core of claim 6, wherein the strong fiberglass mat has a minimum thickness of 0.015 inch.

9. The door core of claim 6, wherein the strong fiberglass mat has a density of 0.5 ounce per square foot or greater.

10. The door core of claim 6, further comprising at least a fourth layer of strong fiberglass mat saturated with sodium silicate bonded to the first, second or third layer.

11. The door core of claim 6, further comprising at least on additional structural layer comprising one member selected from the group consisting of: silica cloth, hardboard, fiberglass cloth, carbon fiber, carbon fiber fabric, metal sheet, metal mesh, composite mesh, plastic sheet, and combinations thereof.

12. The door core of claim 6, wherein the strong fiberglass mat further comprises chop-strand fiberglass bound together.

* * * * *